US009200813B2

(12) United States Patent
Harayama

(10) Patent No.: US 9,200,813 B2
(45) Date of Patent: Dec. 1, 2015

(54) AIR-CONDITIONING CONTROLLING DEVICE AND METHOD

(75) Inventor: Kazuya Harayama, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 687 days.

(21) Appl. No.: 13/501,567

(22) PCT Filed: Oct. 21, 2010

(86) PCT No.: PCT/JP2010/068587
§ 371 (c)(1),
(2), (4) Date: Apr. 12, 2012

(87) PCT Pub. No.: WO2011/049165
PCT Pub. Date: Apr. 28, 2011

(65) Prior Publication Data
US 2012/0209435 A1      Aug. 16, 2012

(30) Foreign Application Priority Data

Oct. 21, 2009   (JP) .................................. 2009-242147

(51) Int. Cl.
*F24F 11/00* (2006.01)
*F24F 11/02* (2006.01)
*G06F 17/50* (2006.01)

(52) U.S. Cl.
CPC ......... *F24F 11/0086* (2013.01); *F24F 11/0012* (2013.01); *F24F 11/022* (2013.01); *G06F 17/5018* (2013.01); *G06F 2217/80* (2013.01)

(58) Field of Classification Search
CPC ............. G06F 17/5018; G06F 2217/80; F24F 11/0009; F24F 11/0012; F24F 11/0068; F24F 11/0086; F24F 11/022
USPC .................. 700/276, 278, 286, 300; 165/237; 454/184, 258; 703/2, 5; 702/131
See application file for complete search history.

(56) References Cited

U.S. PATENT DOCUMENTS 6,834,208 B2 *   12/2004   Gonzales et al. ............... 700/86
8,412,382 B2 *   4/2013    Imes et al. ..................... 700/277
(Continued)

FOREIGN PATENT DOCUMENTS

CN        101251289 A     8/2008
CN        101307944 A    11/2008
(Continued)

OTHER PUBLICATIONS

K. Hiroi, Fundamentals and Applications of Digital Metering Equipment Control Systems, Industrial Engineering Company, pp. 152-156, Oct. 1987.
(Continued)

*Primary Examiner* — Kenneth M Lo
*Assistant Examiner* — Jennifer L Norton
(74) *Attorney, Agent, or Firm* — Troutman Sanders LLP

(57) ABSTRACT

Distribution data indicating the distribution of the temperatures and airflows in an air-conditioned space are calculated through forward analysis of the state of the air-conditioned space through a distributed system heat flow analysis technique by the heat flow forward analysis processing portion based on spatial condition data and state data comprising boundary condition data and heat emitting object data, and setting data comprising this distribution data that has been obtained and the target data that indicate the target temperatures at the target locations is generated by the setting data generating portion, and new air-conditioning operating quantities are back-calculated from the new blowing speeds and blowing temperatures for the conditioned air at the blowing vents through reverse analysis of the distributions of the temperatures and airflows in the air-conditioned space, and the air-conditioning system is controlled based on the new air-conditioning operating quantities obtained thereby.

10 Claims, 13 Drawing Sheets

(56) References Cited

U.S. PATENT DOCUMENTS

| | | | |
|---|---|---|---|
| 8,630,741 B1* | 1/2014 | Matsuoka et al. | 700/276 |
| 2007/0221739 A1* | 9/2007 | Kochuba | 236/1 G |
| 2008/0133147 A1 | 6/2008 | Ohtsuka et al. | |
| 2008/0277486 A1* | 11/2008 | Seem et al. | 236/49.3 |
| 2009/0065596 A1* | 3/2009 | Seem et al. | 236/51 |
| 2009/0276193 A1 | 11/2009 | Momose et al. | |
| 2011/0056673 A1* | 3/2011 | Jang et al. | 165/201 |
| 2013/0261805 A1* | 10/2013 | Kuroiwa et al. | 700/276 |
| 2013/0274928 A1* | 10/2013 | Matsuoka et al. | 700/276 |

FOREIGN PATENT DOCUMENTS

| | | |
|---|---|---|
| CN | 100468245 A | 3/2009 |
| CN | 101490479 A | 7/2009 |
| EP | 2017755 A1 | 1/2009 |
| EP | 2060857 A1 | 5/2009 |
| JP | 2003-207189 A | 7/2003 |
| JP | 2004-69273 A | 3/2004 |
| JP | 2005-331209 A | 12/2005 |
| JP | 2010-139119 A | 6/2010 |
| WO | 2005/114058 A1 | 12/2005 |
| WO | 2007/122677 A1 | 11/2007 |

OTHER PUBLICATIONS

S. Kato, et al., Scales for Assessing Contribution of Heat Sources and Sinks to Temperature Distributions in Room by Means of Numerical Simulation, Institute of Industrial Science, University of Tokyo, Air-Conditioning and Sanitation Engineering Reports No. 69, pp. 39-47, Apr. 1998.

International Search Report (with English translation), dated Jan. 25, 2011, which issued during the prosecution of International Application No. PCT/JP2010/068587, which corresponds to the present application.

Written Opinion (with English translation), dated Jan. 25, 2011, which issued during the prosecution of International Application No. PCT/JP2010/068587, which corresponds to the present application.

* cited by examiner

FIG. 2

| Spatial Condition Data | Location | Shape |
|---|---|---|
| Room Interior Shape | x, y, z | dx, dy, dz |
| Impediments (Desks, Chairs, Partitions,...) | x, y, z | dx, dy, dz |
| Blowing Vents | x, y, z | dx, dy, dz |
| Intake Vents | x, y, z | dx, dy, dz |
| Opening Portions | x, y, z | dx, dy, dz |
| Fans | x, y, z | dx, dy, dz |
| ... | | |

FIG. 3

| Boundary Condition Data | Values |
|---|---|
| Blowing Vents | u, v, w, T |
| Intake Vents | u, v, w |
| Opening Portions | T |
| Fans | u, v, w |
| ... | |

FIG. 4

| Heat Generating Object Data | Locations | Shapes | Values |
|---|---|---|---|
| Heat Generating Objects (People, Lights, Electronic Equipment,...) | x, y, z | dx, dy, dz | Q |
| ... | | | |

FIG. 5

| Distribution Data | Locations | Values |
|---|---|---|
| Airflow Speed Distribution | x, y, z | $u_{CSD}, v_{CFD}, w_{CFD}$ |
| Temperature Distribution | x, y, z | $T_{CFD}$ |

FIG. 6

| Setting Data | Locations | Shapes | Values |
|---|---|---|---|
| Airflow Speed Distribution | x, y, z | – | $u_{CSD}, v_{CFD}, w_{CFD}$ |
| Temperature Distribution | x, y, z | – | $T_{CFD}$ |
| Target Location | x, y, z | dx, dy, dz | T |

| Operating Quantity Data | Locations | Shapes | Values |
|---|---|---|---|
| Blowing Vents | x, y, z | dx, dy, dz | u, v, w, T |
| Intake Vents | x, y, z | dx, dy, dz | u, v, w |

AIR-CONDITIONING CONTROLLING DEVICE AND METHOD

CROSS REFERENCE TO PRIOR APPLICATIONS

This application is a. U.S. National Phase application under 35 U.S.C. §371 of International Application No. PCT/JP2010/068587, filed on Oct. 21, 2010 and claims benefit of priority to Japanese Patent Application No. 2009-242147, filed on Oct. 21, 2009. The International Application was published in Japanese on Apr. 28, 2011 as WO 2011/049165 A1 under PCT Article 21(2). All of these applications are herein incorporated by reference.

FIELD OF TECHNOLOGY

The present invention relates to an air-conditioning controlling technology, and, in particular, relates to an air-conditioning controlling technology for controlling a conditioning environment in a target location within a space.

BACKGROUND

When maintaining a space in a desired existing environment, not only is air-conditioning equipment installed in the air-conditioned space for which air-conditioning is to be performed, but also temperature sensors are disposed at locations that are representative of areas of the air-conditioned space, and operating quantities for the airflow speed, the airflow direction, the temperature, and the like, of the conditioned air that is provided from the air-conditioning equipment are determined in accordance with the outputs of the temperature sensors.

In air-conditioning equipment for industrial processes, even in cases wherein there are massive heat sources, such as, for example, heat treatment furnaces for industrial use, equipment design is performed in advance to enable the temperature states to be controlled easily, and, for example, a plurality of heat sources and temperature sensors are disposed so as to be tied together in independent 1-to-1 relationships. Consequently, even if there is so-called thermal interference between heating zones, excellent control is possible in a state wherein a plurality of simple single-loop feedback control systems, such as PIDs, and the like, are of structured so that temperature control is not excessively difficult.

However, in this conventional technology, thermal interference makes it difficult to stabilize the operating quantities in the case of a large space, such as an office, or the like, and thus there is a problem in that this causes good control to be difficult. (See, for example, HIROI, Kazuo: "Fundamentals and Applications of Digital Metering Equipment Control Systems," Industrial Engineering Company, pp. 152-156, October 1987.)

That is, in a large space, such as an office, when it comes to the placement of people, electronic equipment, and the like that act as heat sources, and the placement of desks, chairs, partitions, and the like that become obstructions to the airflow, typically the priority is on efficiency in the work operations, and thus this type of office layout is not designed with a priority on air-conditioning control. Because of this, inevitably there will be strong "thermal interferences" when it conies to the positional relationships between the vents of the air-conditioning facilities and the temperature sensors.

Consequently, in an implementation that is structured from a plurality of single-loop feedback control systems such as in the prior art, described above, it is difficult to stabilize the operating quantities due to this type of thermal interference, making optimal control difficult. For example, when the magnitude of the change in temperature when moving to the desired air-conditioning environment is large, there will be fluctuations in the state of control, and the operating quantities will be unstable because of mismatched operations wherein each of the feedback systems is individually searching for a stabilize state within the system as a whole.

The examples of the present invention solve this type of problem, and the object thereof is to provide an air-conditioning controlling technology able to obtain stabilized operating quantities even in an environment wherein thermal interferences tend to occur, such as a large space.

SUMMARY

In order to achieve such an object, the air-conditioning controlling device according to an example of the present invention includes a storing portion for storing spatial condition data indicating a location and shape pertaining to an air-conditioned space and a location and shape pertaining to a blowing vent for conditioned air produced by an air-conditioning system that performs air-conditioning of a conditioned space; a data inputting portion for inputting boundary condition data indicating the blowing speed and blowing temperature of conditioned air blown from the blowing vent and also heat emitting object data that indicate the location and amount of heat emitted in relation to a heat emitting object that is present in the air-conditioned space; a heat flow forward analyzing portion for calculating distribution data that indicate the distribution of temperatures and airflows of the air-conditioned space through a forward analysis of the state of the air-conditioned space, through a distributed system heat flow analysis technique, based on the spatial data and on state data comprising the boundary condition data and the heat emitting object data; a setting data generating portion for generating setting data comprising the distribution data and target data indicating a target temperature at a target location within the air-conditioned space; a heat flow reverse analysis processing portion for back-calculating a new air-conditioning operating quantity having a new blowing speed and blowing temperature for conditioned air from the blowing vent required to cause the target location to go to the target temperature, through a reverse analysis of the distribution of temperatures and airflows within the conditioned space, through a distributed system heat flow analysis technique, based on the setting data; and an air-conditioning controlling portion for controlling the air-conditioned environment at the target location through controlling the air-conditioning system based on the new air-conditioning operating quantity.

Moreover, the air-conditioning controlling method according to another example includes a storing step wherein a storing portion stores spatial condition data indicating a location and shape pertaining to an air-conditioned space and a location and shape pertaining to a blowing vent for conditioned air produced by an air-conditioning system that performs air-conditioning of a conditioned space; a data inputting step wherein a data inputting portion inputs boundary condition data indicating the blowing speed and blowing temperature of conditioned air blown from the blowing vent and also heat emitting object data that indicate the location and amount of heat emitted in relation to a heat emitting object that is present in the air-conditioned space; a heat flow forward analyzing step wherein a heat flow forward analyzing calculates distribution data that indicate the distribution of temperatures and airflows of the air-conditioned space through a forward analysis of the state of the air-conditioned space, through a distributed system heat flow analysis technique, based on the spatial data and on state data having the boundary condition data and the heat emitting object data; a setting data generating step wherein a setting data generating portion generates setting data comprising the distribution data and target data indicating a target temperature at a target location within the air-conditioned space; a heat flow reverse analysis processing step wherein a heat flow reverse analysis processing portion back-calculates a new air-conditioning operating quantity comprising a new blowing speed and blowing temperature for conditioned air from the blowing vent required to cause the target location to go to the target temperature, through a reverse analysis of the distribution of temperatures and airflows within the conditioned space, through a distributed system heat flow analysis technique, based on the setting data; and an air-conditioning controlling step wherein an air-conditioning controlling portion controls the air-conditioned environment at the target location through controlling the air-conditioning system based on the new air-conditioning operating quantity.

The examples of the present invention enable the calculation, in a systematically stabilized state, of the airflow rates and airflow directions and temperatures at the blowing vents necessary for controlling the temperature of a target location to a target temperature in an air-conditioned space that is subject to air-conditioning. This makes it possible to obtain stabilized operating quantities, even in an environment wherein there is a tendency for there to be thermal interferences, such as a large space such as an office, when compared to the case wherein there is a plurality of single-loop feedback control systems. This enables efficient control to a desired air-conditioned environment, even when thermal interferences occur, such as in a large space.

BRIEF DESCRIPTION OF THE DRAWINGS

FIG. 2 is a structural example of spatial condition data.

FIG. 3 is a structural example of boundary condition data.

FIG. 4 is a structural example of heat producing object data.

FIG. 5 is a structural example of distribution data.

FIG. 6 is a structural example of setting data.

DETAILED DESCRIPTION

Figure 1:
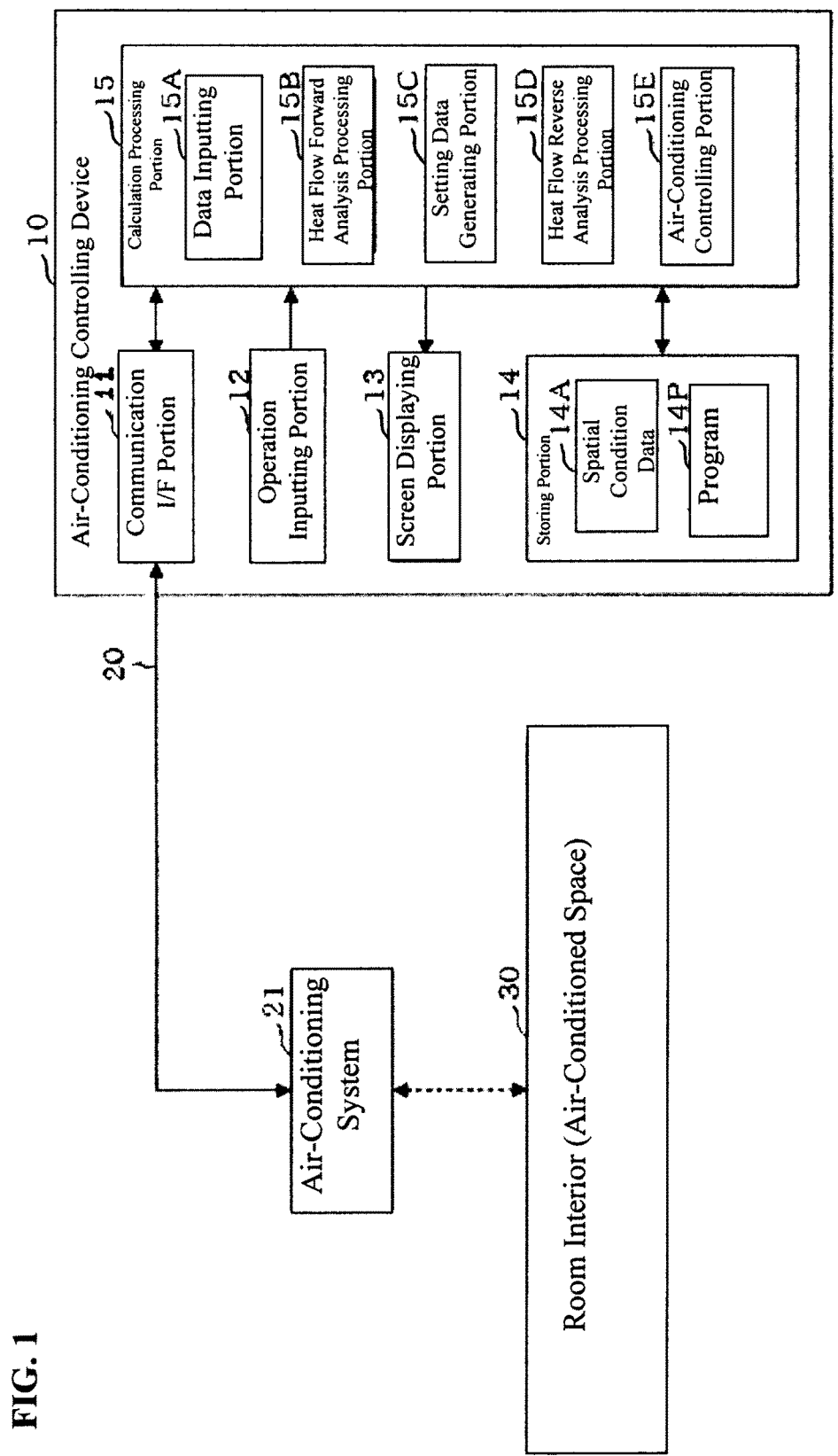
FIG. 1 is a block diagram illustrating a structure of an air-conditioning controlling device according to an example.

An air-conditioning controlling device according to an example of the present invention is explained in reference to FIG. 1.

The air-conditioning controlling device 10 has, overall, an information processing device such as a personal computer or a server, and has a function for controlling the air-conditioning environment at a target location of the air-conditioned space 30 through controlling an air-conditioning system 21 that performs the air-conditioning of the air-conditioned space 30.

In the present example, spatial condition data that indicate locations and shapes pertaining to the air-conditioned space of the air-conditioned space 30 and locations and shapes pertaining to the blowing vents for the conditioned air produced by the air-conditioning system 21 are stored in advance, and boundary condition data that indicate the blowing speeds and the blowing temperature of the conditioned air that is blown out from the blowing vents are inputted, and, additionally, heat emitting object data that indicate the disposal locations and amounts of heat emitted by the individual heat emitting objects that are disposed in the air-conditioned space are inputted as well.

Additionally, distribution data that indicate the distribution of temperatures and airflows in the air-conditioned space are calculated through forward analysis through the distributed system heat flow analysis technique for the state of the air-conditioned space based on the state data comprising the boundary condition data and the heat emitting object data, and then, based on the distribution data that has been obtained and the setting data that include the target data that indicate the target temperatures at target locations, a reverse analysis of the distribution of the temperatures and airflows in the air-conditioned space is performed using the distributed system heat flow analysis technique to back-calculate new air-conditioning operating quantities, comprising new blowing speeds and blowing temperatures for the conditioned air at the blowing vents, required in order to cause the target location to go to the target temperature, and the air-conditioning system 21 is controlled based on the new operating quantities thus obtained.

FIG. 1 will be referenced next to explain in detail the air-conditioning controlling device 10 according to the present example.

This air-conditioning controlling device 10 is provided with a communication I/F portion (hereinafter termed the communication I/F portion) 11, an operation inputting portion 12, a screen displaying portion 13, a storing portion 14, and a calculation processing portion 15, as the primary functional components thereof.

The communication portion 11 is made from a dedicated data communication circuit, and has the function of performing data communication with external devices, such as the air-conditioning system, connected through a communication line 20.

The operation inputting portion 12 is made from an operation inputting device, such as a keyboard or a mouse, and has a function for detecting operations by an operator and outputting them to the calculation processing portion 15.

The screen displaying portion 13 is made from a screen displaying device such as an LCD or a PDP, and has a function for displaying, on a screen, various types of information, such as an operating menu and input/output data, in accordance with instructions from the calculation processing portion 15.

The storing portion 14 is made from a storage device, such as a hard disk or a semiconductor memory, and has a function for storing various types of processing data and a program 14P used by the calculation processing portion 15.

A program 14P is a program that is read out and executed by the calculation processing portion 15, and is stored in advance into the storing portion 14 through the communication I/F portion 11 from an external device or recording medium.

As the primary processing data that is stored in the storing portion 14 there is the spatial condition data 14A. The spatial condition data 14A is data that indicate locations and shapes pertaining to the structural elements that have an impact on the air-conditioning environment of the air-conditioned space 30, such as locations and shapes pertaining to the air-conditioned space of the air-conditioned space 30, blowing vents for the conditioned air produced in the air-conditioning system 21, and the like, and is inputted in advance through the communication LT portion 11 from an external device, such as the air-conditioning system 21, or from a recording medium, or the like, and stored in the storing portion 14.

In FIG. 2, for the "shape of the air-conditioned space" of the air-conditioned space, locations x, y, and z (components in three dimensions) and shapes (sizes) dx, dy, and dz (components in three dimensions) are recorded as spatial conditions for each individual "obstruction" such as desks, chairs, partitions, and the like, that are positioned within the air-conditioned space and that have an effect on the airflow, for the blowing vents that blow, into the air-conditioned space 30, the conditioned air that is produced by the air-conditioning system 21, for the intake vents through which the indoor air within the air-conditioned space 30 is exhausted, for the opening portions for the flow of outside air wherein the indoor air of the air-conditioned space 30 is exchanged naturally with the outside, for the fans for circulating the indoor air of the air-conditioned space 30, and for other structural elements that have an impact on the air-conditioned environment of the air-conditioned space 30.

The calculation processing portion 15 has a microprocessor, such as a CPU and the peripheral circuitry thereof, and has the function of embodying a variety of processing portions through reading in and executed the program 14P from the storing portion 14.

The primary processing portions embodied by the calculation processing portion 15 include a data inputting portion 15A, a heat flow forward analysis processing portion 15B, a setting data generating portion 15C, a heat flow reverse analysis processing portion 15D, and an air-conditioning controlling portion 15E.

The data inputting portion 15A has a function for inputting boundary condition data indicating the degrees of influence there are on the air-conditioned environment through structural elements that have an influence on the air-conditioned environment of the air-conditioned space 30, such as the blowing speed and blowing temperature of the conditioned air that is blown from the blowing vents that are provided in the air-conditioned space 30, and a function for inputting heat emitting object data that indicate the disposal locations and amounts of heat emitted, as well as shapes, of the individual heat emitting objects that are disposed in the air-conditioned space 30, a function for storing in advance, into a storing portion 14, the spatial condition data 14A for the air-conditioned space 30, inputted through a communication I/F portion 11 from an external recording medium or device such as, for example, the air-conditioning system 21, and a function for generating new condition data and heat emitting object data for new air-conditioning control in accordance with the arrival of the air-conditioning controlling timing, by identifying whether or not the air-conditioning controlling timing has arrived with each specific time interval or in accordance with a change in the boundary condition data or heat emitting object data.

The boundary condition data may, for example, be obtained from the air-conditioning system 21 through a communication I/F portion 11. The heat emitting object data may be inputted through an operator operation using the operation inputting portion 12, or heat emitting object data regarding the generating objects in the air-conditioned space 30 may be generated based on various types of data obtained from various systems through the communication I/F portion 11.

In FIG. 3, the degrees of impact exhibited by the airflow speed and airflow direction and temperature are stored as boundary conditions at that point in time for each structural element wherein there has been a change in the impact on the air-conditioning environment of the air-conditioned space 30, of those structural elements included in the spatial condition data. For example, for a "blowing vent," the blowing speed u, v, and w (components in three dimensions) of the conditioned air that blows from the vent, and the air temperature T of the conditioned air that blows from the blowing vent, are recorded, and for an "intake vent," the intake flow speed u, v, and w (components in three dimensions of the room air that is drawn through the intake flow vent is recorded. Moreover, in regards to the "opening portion," the temperature of the air that enters or exits through the opening portion is recorded, and, in regards to the "fan," the airflow rates u, v, and w (components in three dimensions) of the air within the room, blown by the fan, are recorded.

There are those individual structural elements included in these spatial condition data and boundary condition data that can be discarded depending on the structure of the air-conditioned space 30 that is subject to air-conditioning and depending on the level of importance when it comes to air-conditioning control. In the air-conditioning control, those spatial condition data pertaining to the air-conditioned space of the air-conditioned space 30 are essential. Moreover, the blowing vents, which have an extremely large impact on the air-conditioned environment, are also important structural elements, and are essential in the spatial condition data and boundary condition data. Other hand, when it comes to the intake vents, there are spaces wherein none are provided, and the same is true for the opening portions and fans as well.

In FIG. 4, for the structural elements that emit heat in the air-conditioned space 30, for example, people, lighting fixtures, PCs, copy machines, printers, and other electronic equipment, the locations x, y, and z (components in three dimensions) and shapes (sizes) dx, dy, and dz (components in three dimensions) are stored as spatial conditions or each type of heat emitting object, and the heat emitting quantity Q of the heat emitting object is registered as a boundary condition for each.

The heat flow forward analysis processing portion 15B has a function for calculating distribution data that indicate the distribution of temperatures and airflows within the air-conditioned space 30 through a forward analysis of the state of the air-conditioned space 30 through the distributed system heat flow analysis technique based on the spatial condition data and the state data comprising the boundary condition data and the heat emitting object data.

In FIG. 5, not only is the airflow velocity $u_{CFD}$, $v_{CFD}$, and $w_{CFD}$ (components in three dimensions) of the air within the room in each element space stored as airflow velocity distribution data for each location x, y, and z (components in three dimensions) of the element spaces that are set by dividing the air-conditioned space 30 into the form of a mesh, but also the air temperatures $T_{CFD}$ of the room air at each of the element spaces are stored as the temperature distribution data.

The distributed system heat flow analysis technique is a technique for identifying heat flows between contiguous element spaces by dividing the applicable space into a mesh of element spaces, based on computational fluid dynamics (CFD).

As a specific example of a forward analysis technology in the distributed system heat flow analysis technique, there is a proposal for a convective heat transport coupled analysis technology for performing analyses of airflow speeds, airflow directions, and temperatures by solving the NS equations (Navier-Stokes equations) for individual element spaces. (See, for example, KATO, Shinsuke; KOBAYASHI, Hikaru; and, MURAKAMI, Shuzo: "Scales for Assessing Contribution of Heat Sources and Sinks to Temperature Distributions in Room by Means of Numerical Simulation," Institute of Industrial Science, University of Tokyo, Air-Conditioning and Sanitation Engineering Reports No. 69, pp, 36 to 47, April 1998.) Conversely, technologies wherein contact points between element spaces are expressed by thermal resistances and heat flows are analyzed through modeling in the same manner as electric circuits may also be applied.

The setting data generating portion 15C has a function for obtaining target data that indicate the target temperatures at the target locations within the air-conditioned space 30, through a data inputting operation of an operator using the operation inputting portion 12, and a function for generating setting data from the target data that has been obtained and distribution data calculated by the heat flow forward analysis processing portion 15B.

In FIG. 6, not only are locations x, y, and z (components in three dimensions) and shapes (sizes) dx, dy, and dz (components in three dimensions) stored as spatial conditions for the target location in addition to the distribution data calculated by the heat flow forward analysis processing portion 15B, that is, the airflow velocity $u_{CFD}$, $v_{CFD}$, and $w_{CFD}$ (components in three dimensions) of the air within the room in each element space for the locations x, y, and z (components in three dimensions) and the air temperatures $T_{CFD}$ for the air within the room, but also the target temperature T of the target location is stored as a boundary condition. Note that the target location is not limited to a single location, but rather may be a plurality in a scope that can be controlled (a scope wherein a solution can be found).

Figures 7, 8:
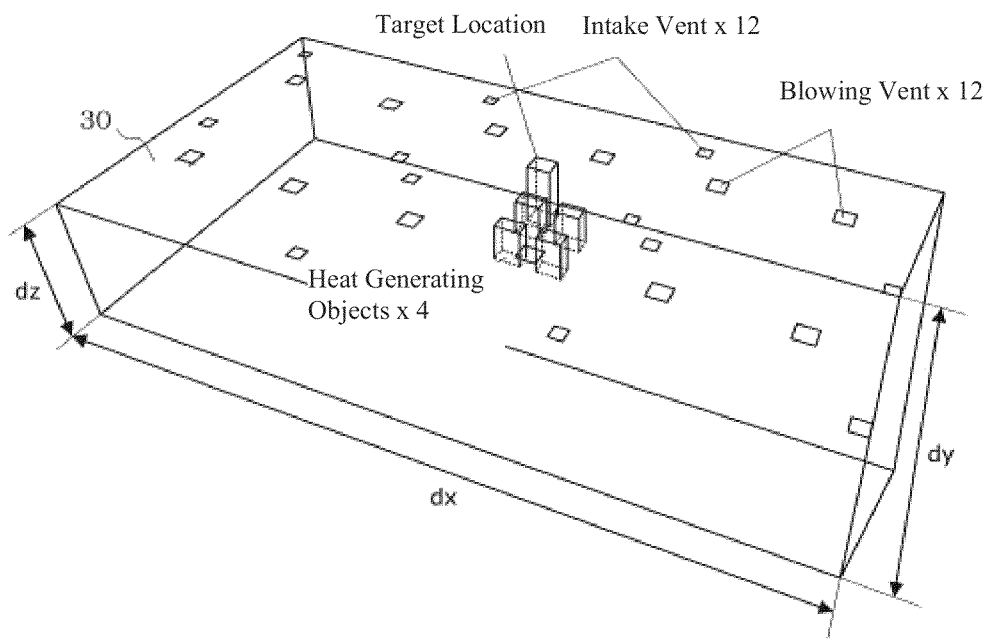
FIG. 7 is a structural example of an air-conditioned space that is subject to air-conditioning.
FIG. 8 is a structural example of air-conditioning operating quantity data.

In FIG. 7, 12 blowing vents and 12 intake vents, are disposed in the ceiling of the air-conditioned space 30, and for heat producing objects, which are people, exist on the floor of the air-conditioned space 30. Moreover, the target location is set to a location surrounding the four heat producing objects.

The heat flow reverse analysis processing portion 15D has a function for calculating sensitivity data that indicates the degree of change in the airflow rates, airflow directions, and temperatures in the individual element spaces, which are required in order to satisfy the target data, through a reverse analysis of the distribution of temperatures and airflows in the air-conditioned space 30 through the distributed system heat flow analysis technique based on the setting data generated by the setting data generating portion 15C, and a function for back-calculating, as new air-conditioning operating quantities, new blowing speeds and blowing temperatures for the conditioned air that is blown from the blowing vents, based on the sensitivity data.

The reverse analysis technology in the distributed system heat flow analysis technique is a technology for calculating sensitivity data that indicates the degree of change in the airflow speeds and airflow directions and temperatures in each of the individuals element spaces required for causing the temperature at a target location to go to a target temperature in a systematically stabilized state, for the airflow speeds and airflow directions and temperatures in the element spaces wherein the applicable space is divided into a mesh of element spaces, which is the inverse of the forward analysis in the distributed system heat flow analysis technique.

As a specific example of a reverse analysis technology pertaining to the distributed system heat flow analysis technique, a technology has been proposed that establishes a desired thermal convection field or mass diffusion field through analyzing the sensitivity, defined as the proportion of change of the design target relative to a change in a design parameter, through solving a perturbation adjoint equation for a non-linear problem regarding the design target, based on the design target that has been set. (See, for example, Patent Reference 4016066.) Here the design parameters correspond to the boundary condition data and heat emitting object data in the present invention, and the design targets correspond to the target temperatures at target locations in the present example.

The air-conditioning controlling portion 15E has a function for controlling the air-conditioning equipment of the air-conditioning system 21 through data communication with the air-conditioning system 21 through the communication I/F portion 11 based on the new air-conditioning operating quantities calculated by the heat flow reverse analysis processing portion 15D.

In FIG. 8, the location x, y, and z (components in three dimensions) and shape (size) dx, dy, and dz (components in three dimensions) are recorded for each blowing vent provided in the air-conditioned space 30, and, as the air-conditioning operating quantities, the blowing speed u, v, and w (components in three dimensions) and the air temperature T of the conditioned air that is blown are recorded. Moreover, the locations x, y, and z (components in three dimensions) and shapes (sizes) dx, dy, and dz (components in three dimensions) are recorded for each of the intake vents that are provided in the air-conditioned space 30, and the intake speeds u, v, and w (components in three dimensions) are recorded as air-conditioning operating quantities.

The operation of the air-conditioning controlling device according to the present example is explained next in reference to FIG. 9 and FIG. 10.

Figure 9:
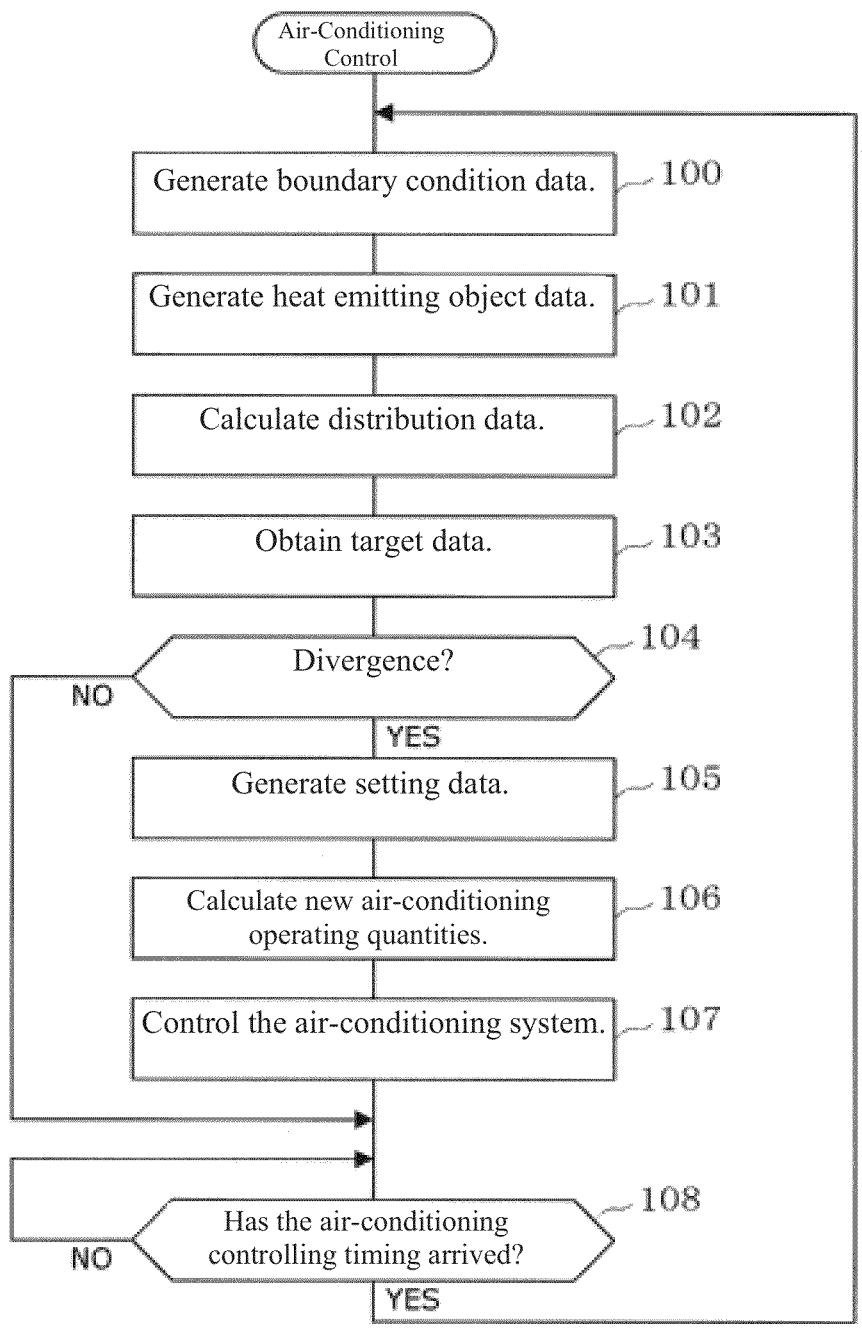
FIG. 9 is a flowchart illustrating an air-conditioning controlling process for an air-conditioning controlling device according to another example.
Figure 10:
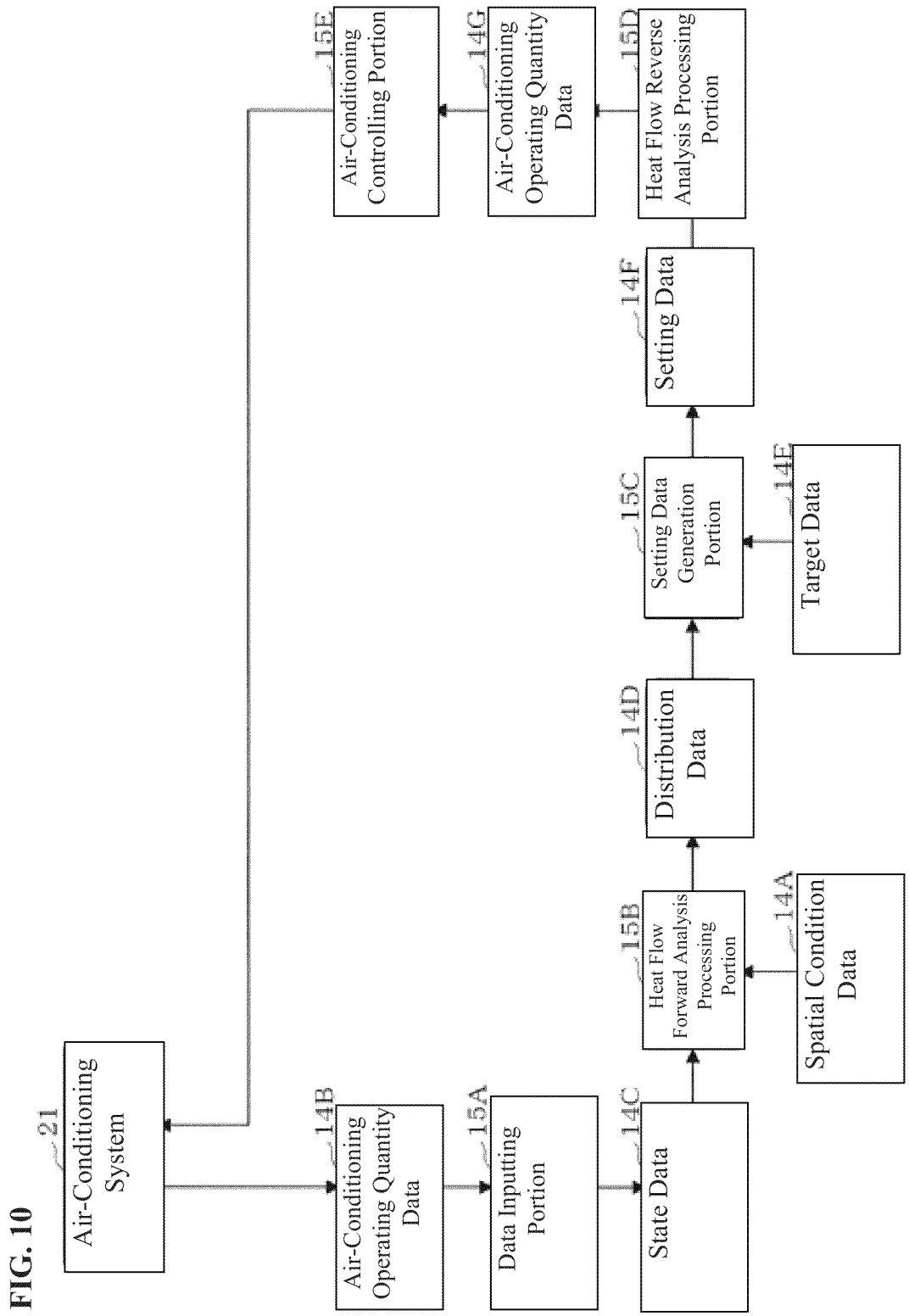
FIG. 10 is a flowchart illustrating an air-conditioning controlling process for an air-conditioning controlling device according to a first form of embodiment.

The calculation processing portion 15 of the air-conditioning controlling device 10 begins the air-conditioning controlling process of FIG. 9 at the time of startup or in response to an operator operation. Note that the spatial condition data 14A is stored in the storing portion 14 in advance, prior to starting the execution of the air-conditioning controlling process.

First the data inputting portion 15A performs data communication with the air-conditioning system 21, through the communication I/F portion 11, to generate boundary condition data from the blowing velocity u, v, and w (components in three dimensions) and the air temperature T at each blowing vent of the air-conditioned space 30, and the intake velocity u, v, and w (components in three dimensions) at each intake vent, included in the air-conditioning operating quantity data 14B that has been obtained (Step 100).

Moreover, the data inputting portion 15A generates heat emitting object data pertaining to the heat emitting objects that exist within the air-conditioned space 30 through data inputting operations by an operator using the operation inputting portion 12 (Step 101).

Next the heat flow forward analysis processing portion 15B calculates the distribution data 14D that indicates the distributions of the temperatures and airflows within the air-conditioned space 30 through forward analysis through the distributed system heat flow analysis technique for the state of the air-conditioned space 30, based on the condition data 14C having the spatial condition data 14A read in from the storing portion 14 and the boundary condition data and the heat emitting object data produced by the data inputting portion 15A (Step 102).

Figure 11:
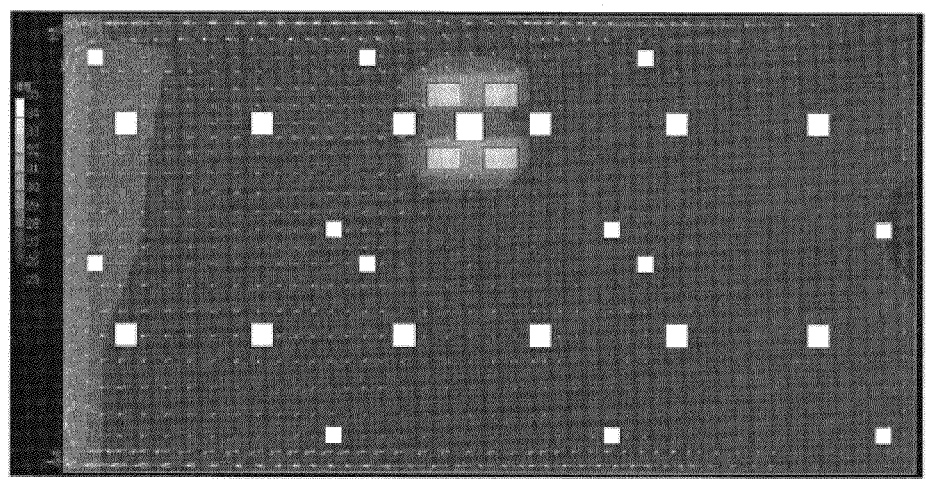
FIG. 11 is a graph illustrating an example of calculating distribution data.

In FIG. 11, the air temperature and each individual element space is expressed by a color bar, as the distribution data relating to the air-conditioned space illustrated in FIG. 7, and the airflow speed of the air in each individual element space is expressed by the size of the arrow, with the airflow direction of the air in each individual airflow space is expressed by the direction of the arrow. In this example, it can be seen that the air temperatures are high in the surroundings of the four heat emitting objects.

Thereafter, the setting data generating portion 15C obtains target data 14E that indicates the target temperatures at the target locations within the air-conditioned space 30, through a data inputting operation of an operator using the operation inputting portion 12, and compares the target data 14E to the distribution data 14D that has been calculated by the heat flow forward analysis processing portion 15B to discern whether or not there is divergence regarding the air-conditioned environment of the air-conditioned space 30 (Step 103).

If at this point the difference between the air temperature at a target location, obtained from the distribution data 14D, and the target temperature specified in the target data 14E is a temperature difference that is no more than a threshold value temperature difference that has been set in advance, then the setting data generating portion 15C identifies that there is no divergence in the air-conditioning environment (Step 104: NO), and processing advances to Step 108, described below.

On the other hand, if the difference between the air temperature at a target location, obtained from the distribution data 14I), and the target temperature specified in the target data 14E is a temperature difference that is more than a threshold value temperature difference that has been set in advance, then the setting data generating portion 15C identifies that there is divergence in the air-conditioning environment (Step 104: YES) and generates setting data 14F comprising the target data 14E and the distribution data 14D that was calculated by the heat flow forward analysis processing portion 5B (Step 105).

In response, the heat flow reverse analysis processing portion 15D calculates sensitivity data indicating the degree of change in the airflow speed and airflow direction and temperature in each individual element space that are required in order to satisfy the target data through a reverse analysis of the temperature and airflow distributions in the air-conditioned space 30 through the distributed system heat flow analysis technique based on the setting data 14F that was generated by the setting data generating portion 15C, and back-calculates the air-conditioning operating quantity data 14G that include the new blowing speed and blowing temperature for the conditioned air for each of the blowing vents, and the intake speed for drawing in the room air into each of the intake vents, based on this sensitivity data (Step 106).

Figure 12:
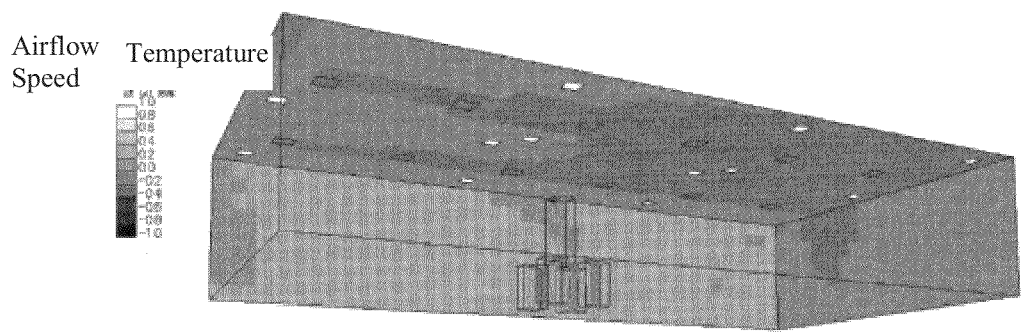
FIG. 12 is a graph illustrating an example of calculating sensitivity data.

In FIG. 12, the sensitivity regarding the airflow speed of the air in the height direction (the Z axis) of individual element space is expressed by a color bar as the sensitivity data pertaining to the air-conditioned space illustrated in FIG. 11. In this example, the sensitivity in the vicinity of the ceiling of the air-conditioned space is around −0.2, and thus it can be understood that and airflow speed in the downward direction is required.

The air-conditioning controlling portion 15E controls the operations of the air-conditioning equipment of the air-conditioning system 21 through data communication with the air-conditioning system 21 through the communication I/F portion 11 based on the air-conditioning operating quantity data 14G calculated by the heat flow reverse analysis processing portion 15D (Step 107).

Thereafter, at regular time intervals, or in response to a change in newly-acquired boundary condition data or heat emitting object data, the data inputting portion 15A identifies the arrival of an air-conditioning control timing (Step 108), and, in response to the arrival of the air-conditioning control timing (Step 108: YES), returns to Step 100, and starts the air-conditioning control again.

In this way, in the present example, the distribution data 14D that indicate the distribution of the temperatures and airflows in the air-conditioned space are calculated through forward analysis of the state of the air-conditioned space through the distributed system heat flow analysis technique by the heat flow forward analysis processing portion 15B based on the spatial condition data and the state data comprising the boundary condition data and the heat emitting object data, and setting data 14F having the distribution data that has been obtained and the target data 14E that indicate the target temperatures at the target locations is generated by the setting data generating portion 15C, and new air-conditioning operating quantities are back-calculated from the new blowing speeds and blowing temperatures for the conditioned air at the blowing vents required in order to cause the target locations to go to the target temperatures through reverse analysis of the distributions of the temperatures and airflows in the air-conditioned space through the distributed system heat flow analysis technique by the heat flow reverse analysis processing portion 15D, and the air-conditioning system 21 is controlled based on the new air-conditioning operating quantities obtained thereby.

This enables the calculation, in a systematically stabilized state, of the airflow rates and airflow directions and temperatures at the blowing vents necessary for controlling the temperature of a target location to a target temperature in an air-conditioned space 30 that is subject to air-conditioning. This makes it possible to obtain stabilized operating quantities, even in an environment wherein there is a tendency for there to be thermal interferences, such as a large space such as an office, when compared to the case wherein there is a plurality of single-loop feedback control systems. Moreover, while, conventionally, there may have been a problem in that it has not been possible to measure a temperature of a target location which one wished to control when it comes to an indoor layout that has not been designed with the priority on air-conditioning control, in the present example is possible to set any given location as the target location to be controlled in the heat flow reverse analysis processing, thus making it possible to control any given location within a large space to a desired air-conditioned environment with excellent efficiency. This enables efficient control of any given location to a desired air-conditioned environment.

Moreover, in the data inputting portion 15A in the present example, the identification of the arrival of the air-conditioning controlling timing is performed either at set intervals or in accordance with a change in the boundary condition data or the heat emitting object data, and, in accordance with the arrival of the air-conditioning controlling timing, the boundary condition data and heat emitting object data is generated anew for new air-conditioning control, thus making it possible to iterate the air-conditioned control efficiently, making it possible to maintain the air-conditioned environment in accordance with the target data 14E.

Figure 13:
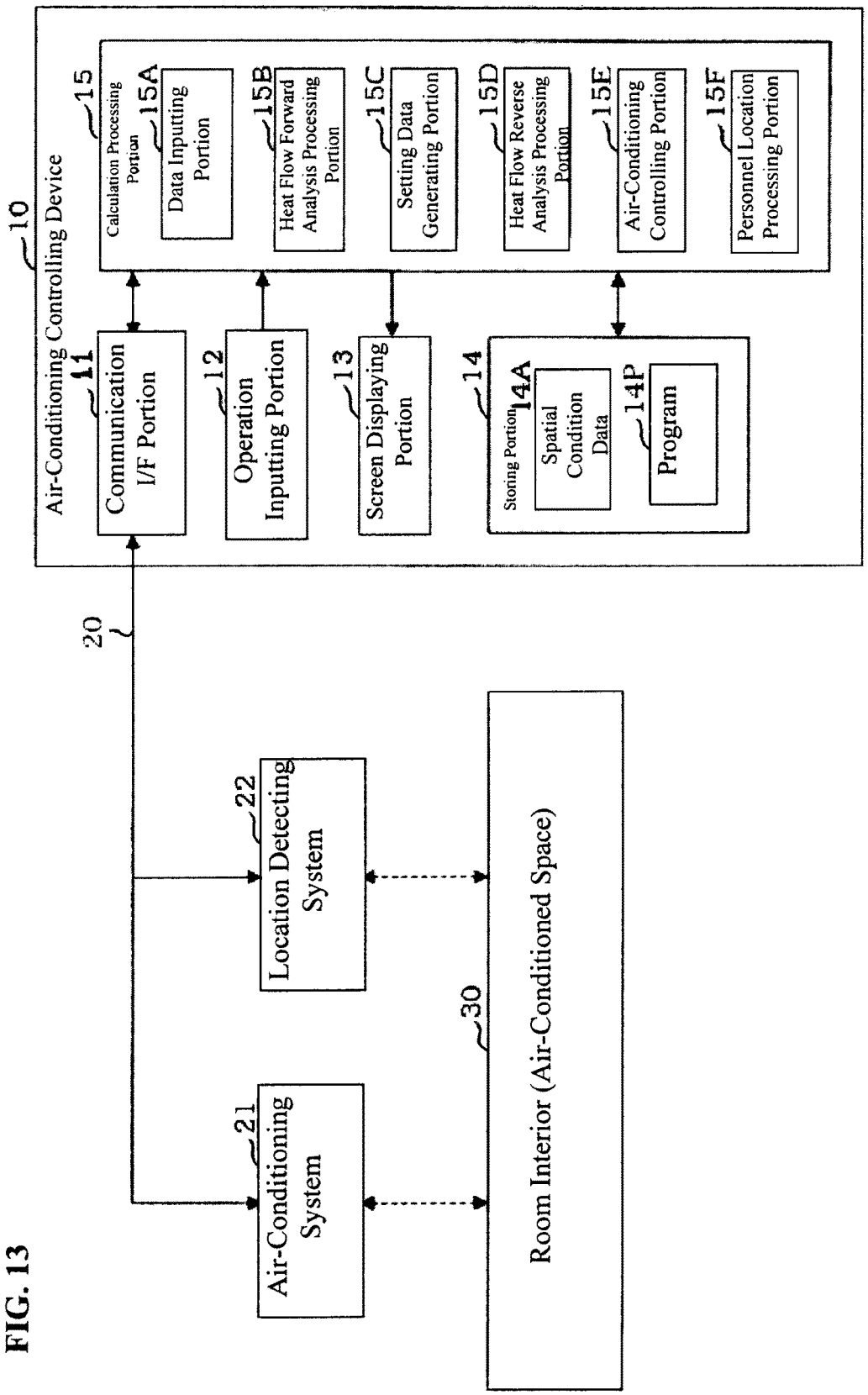
FIG. 13 is a block diagram illustrating a structure of an air-conditioning controlling device according to a further example.

Next an air-conditioning controlling device according to another example of the present invention is explained in reference to FIG. 13.

In the this example, the explanation is for a case wherein the heat emitting object data pertaining to personnel are generated automatically through identifying automatically the locations of the personnel that are the heat emitting objects in the air-conditioned space 30 through the use of a location detecting system 22 that is provided together with the air-conditioning system 21 for the air-conditioned space 30.

In FIG. 13, the location detecting system 22 is a system for detecting the locations of personnel using human-sensitive sensors, RFID tags, camera images, infrared images, ultrasonic information, or the like, and may use commonly known technologies.

A personnel location processing portion 15F is added to the calculation processing portion 15 of the air-conditioning controlling device 10. The personnel location processing portion 15F has a function for obtaining detection data through performing data communication with the location detecting system 22 through the communication I/F portion 11 and a function for identifying the locations of personnel that are present in the air-conditioned space 30 based on the detection data and outputting the identification results as personnel location identification results 14H.

The data inputting portion 15A has a function for generating heat emitting object data for each individual that is present in the air-conditioned space 30, including the locations wherein the personnel are present, the amounts of heat emitted and the shapes thereof, obtained from human data 14I of the storing portion 14, in accordance with the locations where personnel are present in the air-conditioned space 30, identified by the personnel location processing portion 15F. At this time, human data 14I, which include the amounts of heat emitted and the shapes thereof, are stored in advance in the storing portion 14 as average data for personnel.

The other structures in the air-conditioning controlling device 10 are identical to those in the above example, and thus detailed explanations thereof will be omitted here.

Figure 14:
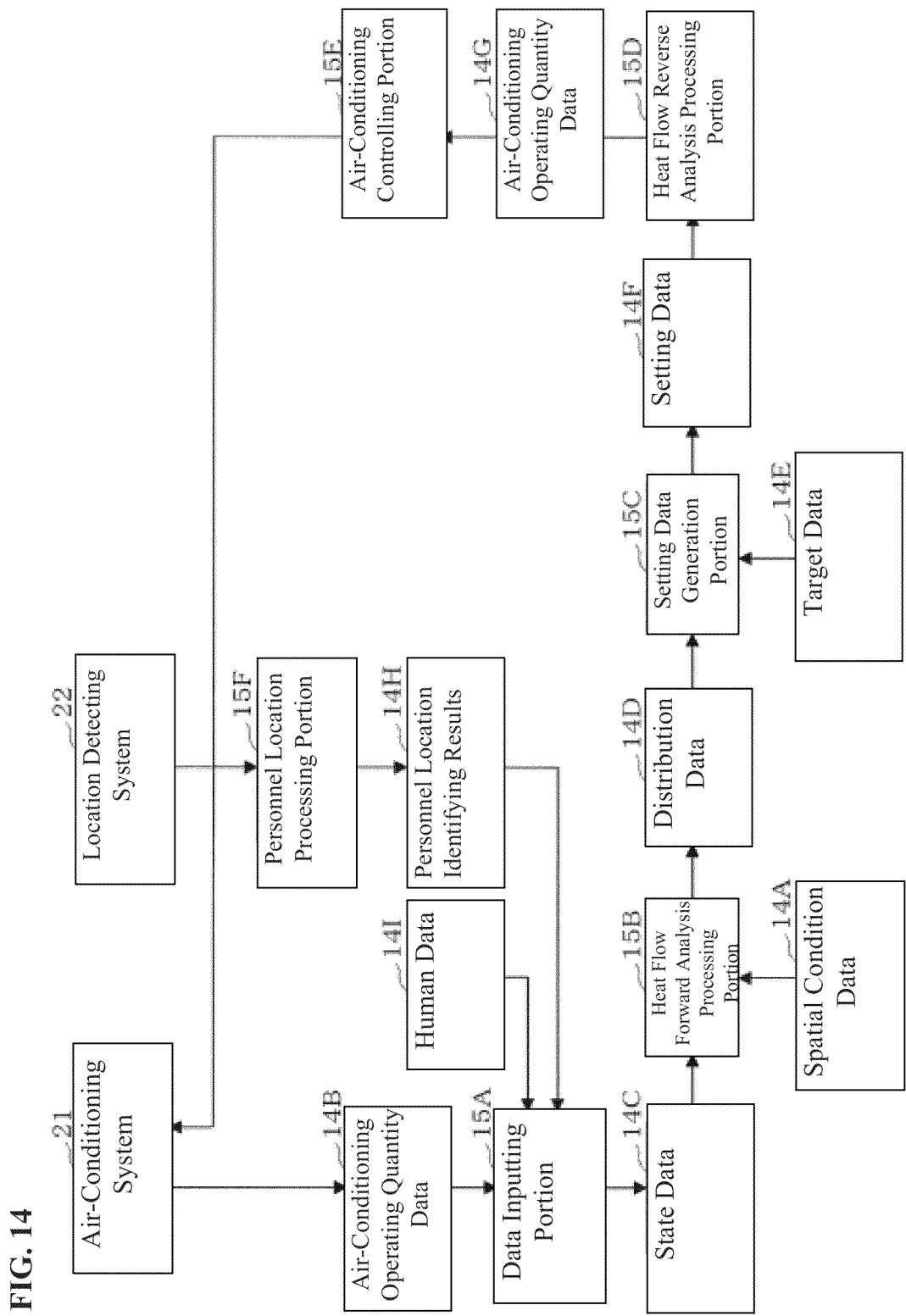
FIG. 14 is a flowchart illustrating an air-conditioning controlling process for an air-conditioning controlling device according to the further example.

The operation of the air-conditioning controlling device according to the present example is explained next in reference to FIG. 14.

When compared to the above example, the overall air-conditioning controlling process sequence is identical to that in FIG. 9, but the process for generating the heat emitting object data in the data inputting portion 15A is different.

First, the personnel location processing portion 15F identifies the locations of personnel that exist within the air-conditioned space 30, based on the detection data obtained through data communication with the location detecting system 22 through the communication I/F portion 11, to generate the personnel location identification results 14H that indicate the locations x, y, and z (components in three dimensions) thereof.

The data inputting portion 15A generates the heat emitting object data pertaining to the heat emitting objects that are present in the air-conditioned space 30 through the data inputting operations by an operator using the operation inputting portion 12. At this time, the data inputting portion 15A generates the heat emitting object data, for each individual that is present within the air-conditioned space 30, including the locations where personnel are present, included in the personnel location identification results 14H, and the amounts of heat emitted, and the shapes thereof, obtained from the human data 14I of the storing portion 14, based on the personnel location identification results 14H obtained from the personnel location processing portion 15F.

In this way, in the present example, human data 14I that includes the amount of heat emitted by an individual is stored in the storing portion 14, and the heat emitting object data for each individual that is present in the air-conditioned space 30 is generated from the locations wherein personnel are present and the heat emitting quantities obtained from the human data 14I, in response to the locations where personnel are present in the air-conditioned space, which have been inputted by the data inputting portion 15A.

Doing so makes it possible to generate automatically the heat emitting object data pertaining to the personnel through inputting, into the data inputting portion 15A, the locations where personnel are present, identified by the personnel location processing portion 15F based on the detection data from the location detecting system 22. This makes it possible to perform detailed air-conditioning control taking into account the amount of heat emitted by the personnel, even when the personnel are moving within the air-conditioned space 30.

Note that the location detecting system 22 is not limited to a system that is dedicated to location detection, but rather may be another system insofar as it is a system that is able to obtain detection data able to infer the locations of personnel. For example, it is possible to obtain detection data from the lighting system that indicate the locations of lighting fixtures that are illuminated, and it is possible to infer the presence of a person near to the lighting fixture that is illuminated, thus making it possible to infer the locations of presence of personnel from this detection data. Moreover, monitoring the operating statuses of PCs that are connected to a LAN, through a network monitoring system, makes it possible to infer the locations of personnel near to those PCs.

Figure 15:
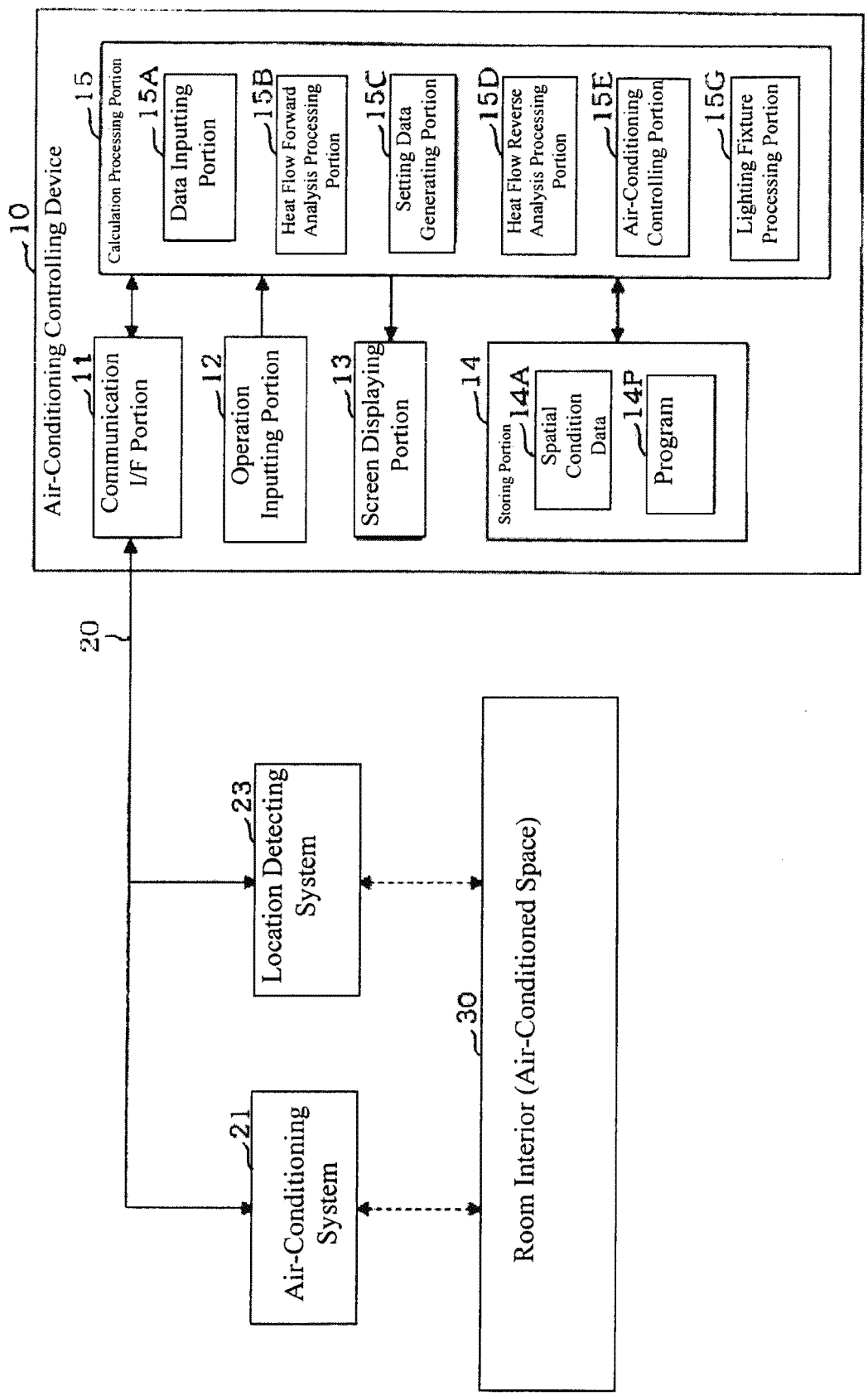
FIG. 15 is a block diagram illustrating a structure of an air-conditioning controlling device according to yet another example.

Next an air-conditioning controlling device according to a further example according to the present invention is explained in reference to FIG. 15.

In the present example, the explanation is for a case wherein the heat emitting object data pertaining to lighting fixtures are generated automatically through identifying automatically the locations of the lighting fixtures that are the heat emitting objects in the air-conditioned space 30 through the use of a lighting system 23 that is provided together with the air-conditioning system 21 for the air-conditioned space 30.

In FIG. 15, the lighting system 23 controls the operation of individual lighting fixtures that are disposed in the air-conditioned space 30, where a common known technology may be used.

A lighting fixture processing portion 15G is added to the calculation processing portion 15 of the air-conditioning controlling device 10. The lighting fixture processing portion 15G has a function for obtaining illumination status data through performing data communication with the lighting system 23 through the communication portion 11, and a function for identifying the lighting fixtures that are illuminated within the air-conditioned space 30, based on the illumination status data, and for outputting, as lighting fixture illumination identification results 14J, identification information for the lighting fixtures.

The data inputting portion 15A has a function for generating heat emitting object data for each lighting fixture that is illuminated, from the existence locations and amounts of heat emitted relating to lighting fixtures obtained from lighting fixture data 14K of the storing portion 14 the corresponding to the applicable identification information, in accordance with identification information that indicate the lighting fixtures that are illuminated within the air-conditioned space 30, included in the lighting fixture illumination identification results 14J from the lighting fixture processing portion 15G. At this time, lighting fixture data 14K, including the disposal locations, amounts of heat emitted, and shapes, are stored in advance in the storing portion 14 as data pertaining to the individual lighting fixtures.

The other structures in the air-conditioning controlling device 10 are identical to those in the above examples, and thus detailed explanations thereof will be omitted here.

Figure 16:
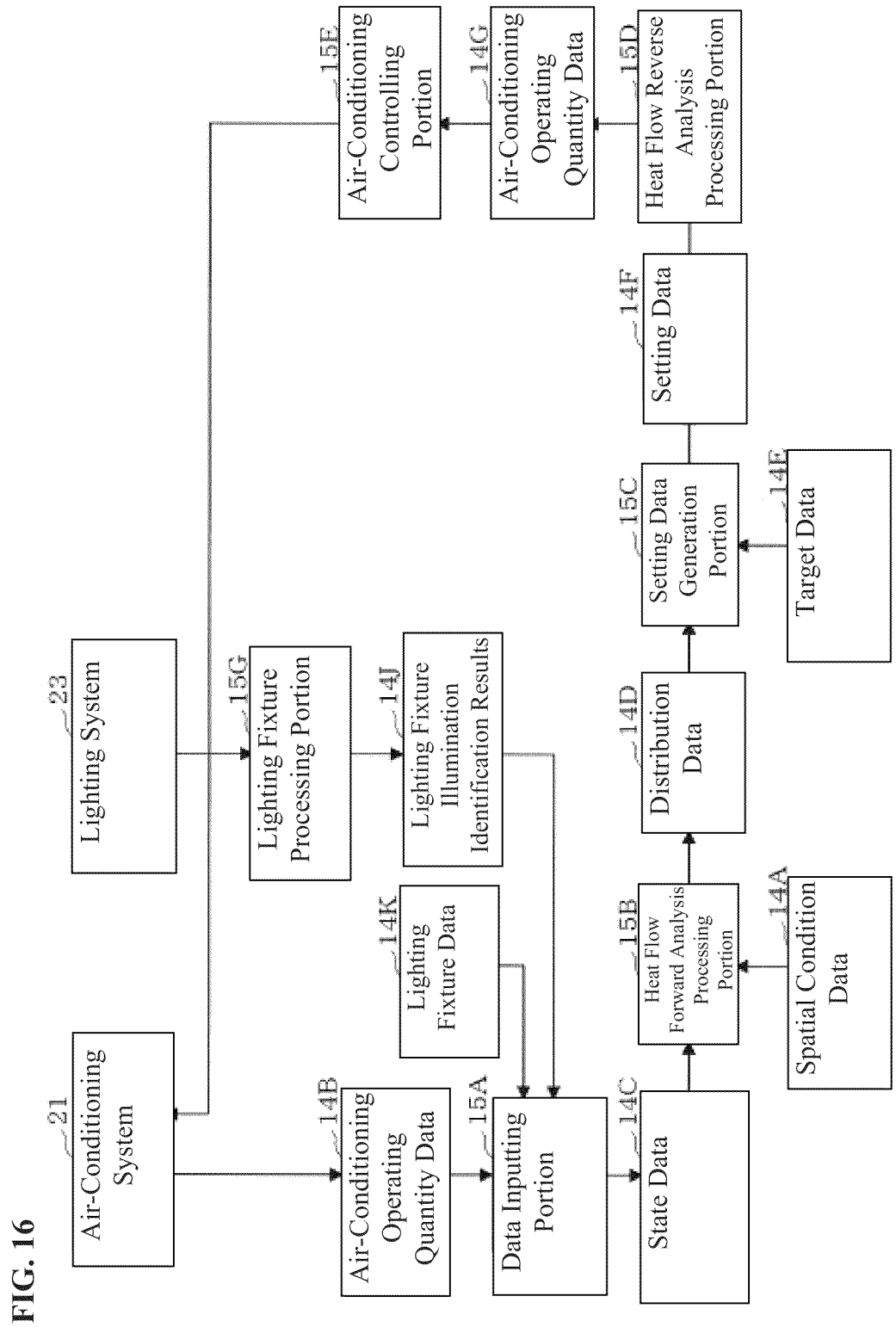
FIG. 16 is a flowchart illustrating an air-conditioning controlling process for an air-conditioning controlling device according to other example.

The operation of the air-conditioning controlling device according to the present example is explained next in reference to FIG. 16.

When compared to the above the overall air-conditioning controlling process sequence is identical to that in FIG. 9, but the process for generating the heat emitting object data in the data inputting portion 15A is different.

First the lighting fixture processing portion 15G identifies those lighting fixtures that are illuminated, among the lighting fixtures that are disposed within the air-conditioned space 30, based on illumination status data obtained through data communication with the lighting system 23 through the communication I/F portion 11, to generate lighting fixture illumination identification results 14J that indicate this identification information.

The data inputting portion 15A generates the heat emitting object data pertaining to the heat emitting objects that are present in the air-conditioned space 30 through the data inputting operations by an operator using the operation inputting portion 12. At this time, the data inputting portion 15A generates the heat emitting object data, for each lighting fixture that is illuminated, comprising the disposal locations, the amounts of heat emitted, and the shapes thereof, obtained from the lighting fixture data 14K of the storing portion 14, based on the lighting fixture illumination identification results 14J obtained from the lighting fixture processing portion 15G.

In this way, in the present example, the lighting fixture data 14K, which include, for each lighting fixture that is disposed in the air-conditioned space, the disposal location and the amount of heat emitted by the lighting fixture when illuminated, for the applicable lighting fixture, is stored in the storing portion 14, and the heat emitting object data is generated for each lighting fixture that is illuminated, from the disposal location and the amount of heat emitted, obtained from the lighting fixture data 14K, in accordance with the illumination status of each individual lighting fixture in the air-conditioned space, inputted through the data inputting portion 15A.

This makes it possible to generate automatically the heat emitting object data pertaining to these lighting fixtures through inputting, into the data inputting portion 15A, identification information for the lighting fixtures that are illuminated, identified by the lighting fixture processing portion 15G based on the illumination status data from the lighting system 23 pertaining to the individual lighting fixtures. This makes it possible to perform detailed air-conditioning control in consideration of the amount of heat emitted from the lighting fixtures that are illuminated, even when the individual lighting fixtures within the air-conditioned space 30 are turned ON/OFF individually.

Note that while the explanation in the present example used lighting fixtures, heat emitting object data pertaining to electric devices can be generated automatically through identifying automatically the locations of electric equipment that are heat emitting objects in the air-conditioned space 30 through the use of an electric power consumption monitoring system that is provided in parallel with the air-conditioning system 21 for the air-conditioned space 30.

The electric power consumption monitoring system is a system for detecting the electric power consumed by an electric device that is disposed in the air-conditioned space 30 using, for example, an amp meter at a measurement point such as an electric cable or an electric plug, or the like, and a common known technology may be used.

As a result, it is possible to generate automatically heat emitting object data pertaining to these electric devices because it is possible to infer, from the electric power consumption detected by the electric power consumption monitoring system, the electric devices that are in operation, if electric device data is stored in advance in the storing portion 14 in the same manner as with the lighting fixture data.

Figure 17:
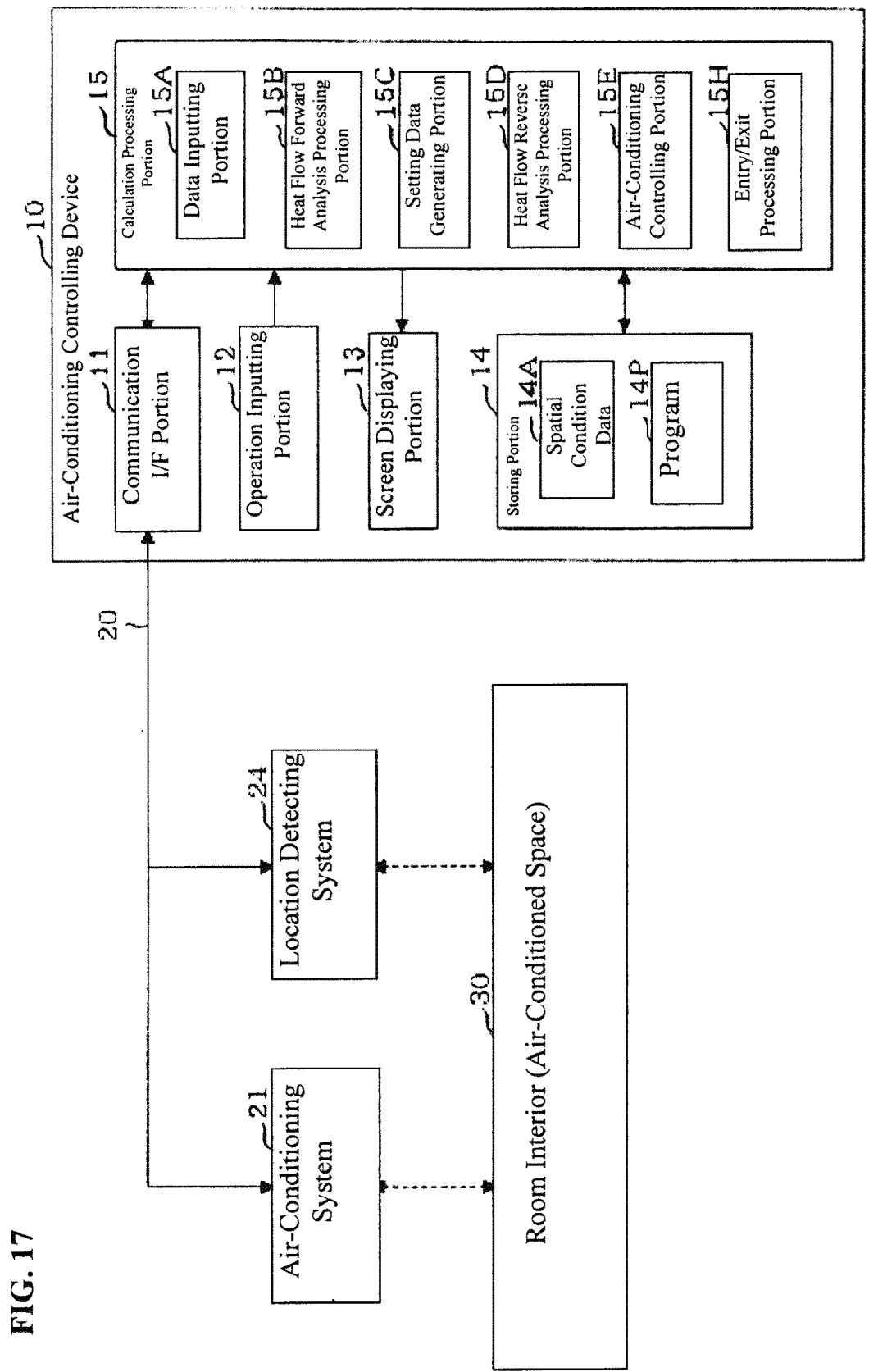
FIG. 17 is a block diagram illustrating a structure of an air-conditioning controlling device according to an example.

Next an air-conditioning controlling device according to yet another example is explained in reference to FIG. 17.

In the present example, the explanation is for a case wherein the heat emitting object data pertaining to personnel are generated automatically through identifying automatically the occupancy locations of the personnel that are the heat emitting objects in the air-conditioned space 30 through the use of an entry/exit controlling system 24 that is provided together with the air-conditioning system 21 for the air-conditioned space 30.

In FIG. 17, the entry/exit controlling system 24 is a system that controls entry/exit of individuals into/out of rooms related to the air-conditioned space 30, using an identification medium, such as an ID card, or using biometric information, and a common known technology may be used.

An entry/exit processing portion 15H is added to the calculation processing portion 15 of the air-conditioning controlling device 10. This entry/exit processing portion 1511 has a function for obtaining entry/exit data through performing data communication with the entry/exit controlling system 24 through the communication I/F portion 11, and a function for identifying identification information for personnel that are present in the air-conditioned space 30 based on the entry/exit data, and has a function for outputting this identification information as personnel identification results 14L.

The data inputting portion 15A has a function for obtaining personnel occupancy locations from occupancy location data 14M of the storing portion 14 corresponding to the identification information in accordance with personnel identification information in the air-conditioned space 30, identified by the entry/exit processing portion 15H, and a function for generating heat emitting object data, for each individual that is present in the air-conditioned space 30, from the amounts of heat emitted and the shapes, from the occupancy locations and the human data 14I of the storing portion 14. At this time, the occupancy location data 14M that indicates the occupancy location for the applicable individual for each unique identification information for each individual that uses the air-conditioned space 30, and the human data 14I, which include the amounts of heat emitted and the shapes thereof, are stored in advance in the storing portion 14 as average data for personnel.

The other structures in the air-conditioning controlling device 10 are identical to those in the above examples, and thus detailed explanations thereof will be omitted here.

Figure 18:
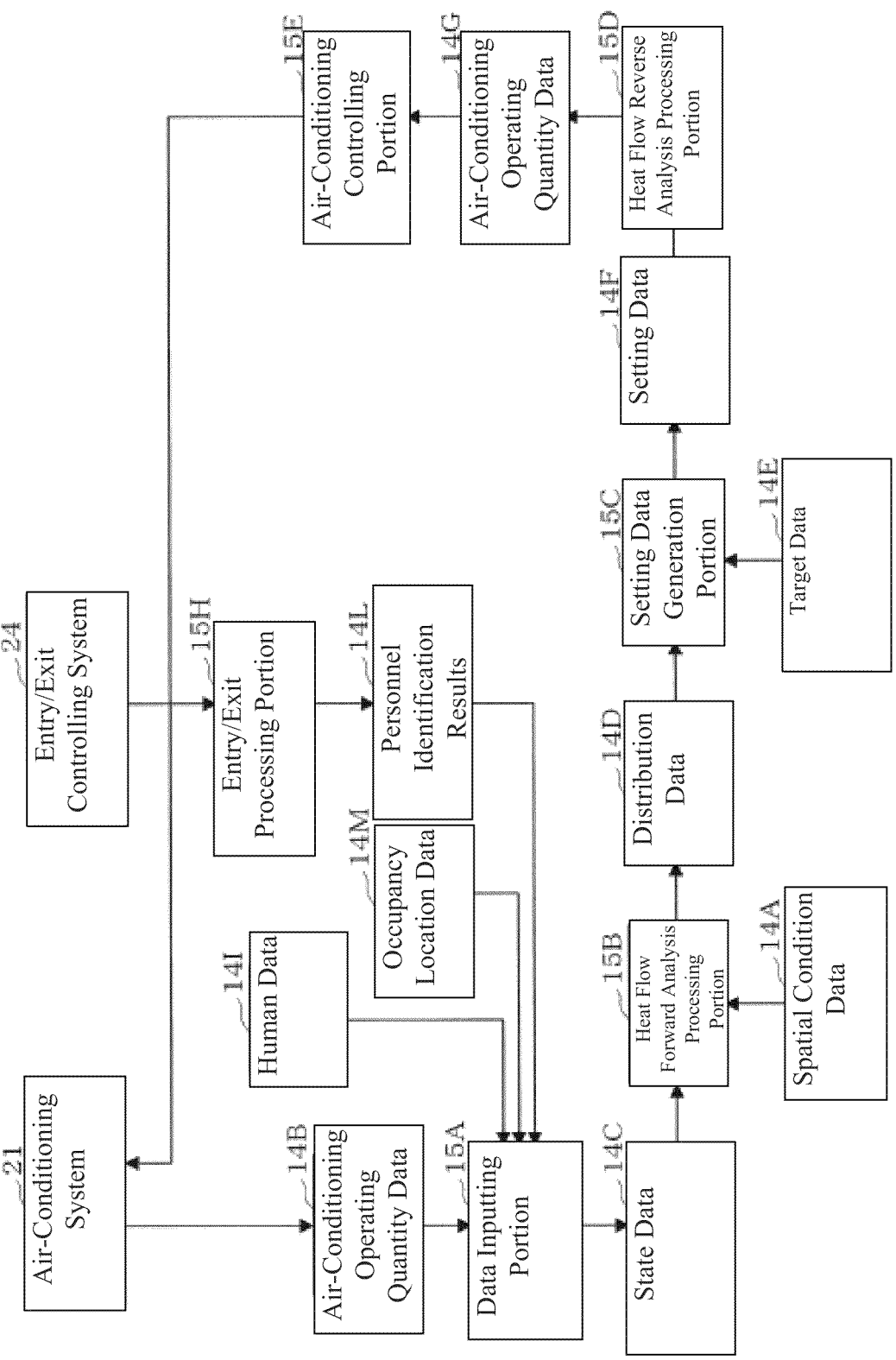
FIG. 18 is a flowchart illustrating an air-conditioning controlling process for an air-conditioning controlling device according to the example.

The operation of the air-conditioning controlling device according to the present example is explained next in reference to FIG. 18.

When compared to the above examples, the overall air-conditioning controlling process sequence is identical to that in FIG. 9, but the process for generating the heat emitting object data in the data inputting portion 15A is different.

First the entry/exit processing portion 15H identifies the identification information for the personnel present in the air-conditioned space 30, based on the entry/exit data obtained through performing data communication with the entry/exit controlling system 24 through the communication I/F portion 11, and generates the personnel identification results 14L.

The data inputting portion 15A generates the heat emitting object data pertaining to the heat emitting objects that are present in the air-conditioned space 30 through the data inputting operations by an operator using the operation inputting portion 12.

At this time, the data inputting portion 15A obtains, for each identification information included in the personnel identification results 14L obtained from the entry/exit processing portion 15H, an occupancy location from the occupancy location data 14M of the storing portion 14 corresponding to the applicable identification information, and generates heat emitting object data for each individual present in the air-conditioned space 30 from the occupancy information and the amount of heat emitted, and the shape thereof, obtained from the human data 14I of the storing portion 14.

In this way, in the present example, the occupancy location data that indicate the occupancy location of the applicable individual for each unique identification information for each individual that uses the air-conditioned space 30, and human data 14I that include the amount of heat emitted in relation to humans, are stored in advance in the storing portion 14, and, based on the identification information for the personnel who are present in the air-conditioned space 30, inputted through the data inputting portion 15A, the occupancy locations of the applicable personal are obtained from the occupancy location data corresponding to this identification information, to generate the heat emitting object data for each individual present in the air-conditioned space 30 from the occupancy locations and the amounts of heat emitted, obtained from the human data 14I.

This makes it possible to generate automatically heat emitting data pertaining to personnel through inputting, into the data inputting portion 15A, identification information for each individual that is present in the air-conditioned space 30, identified by the entry/exit processing portion 15H, based on entry/exit data from the entry/exit controlling system 24. Consequently, it is possible to perform detailed air-conditioning control, taking into account the amount of heat emitted from personnel, even when individuals move into and out of the air-conditioned space 30.

Figure 19:
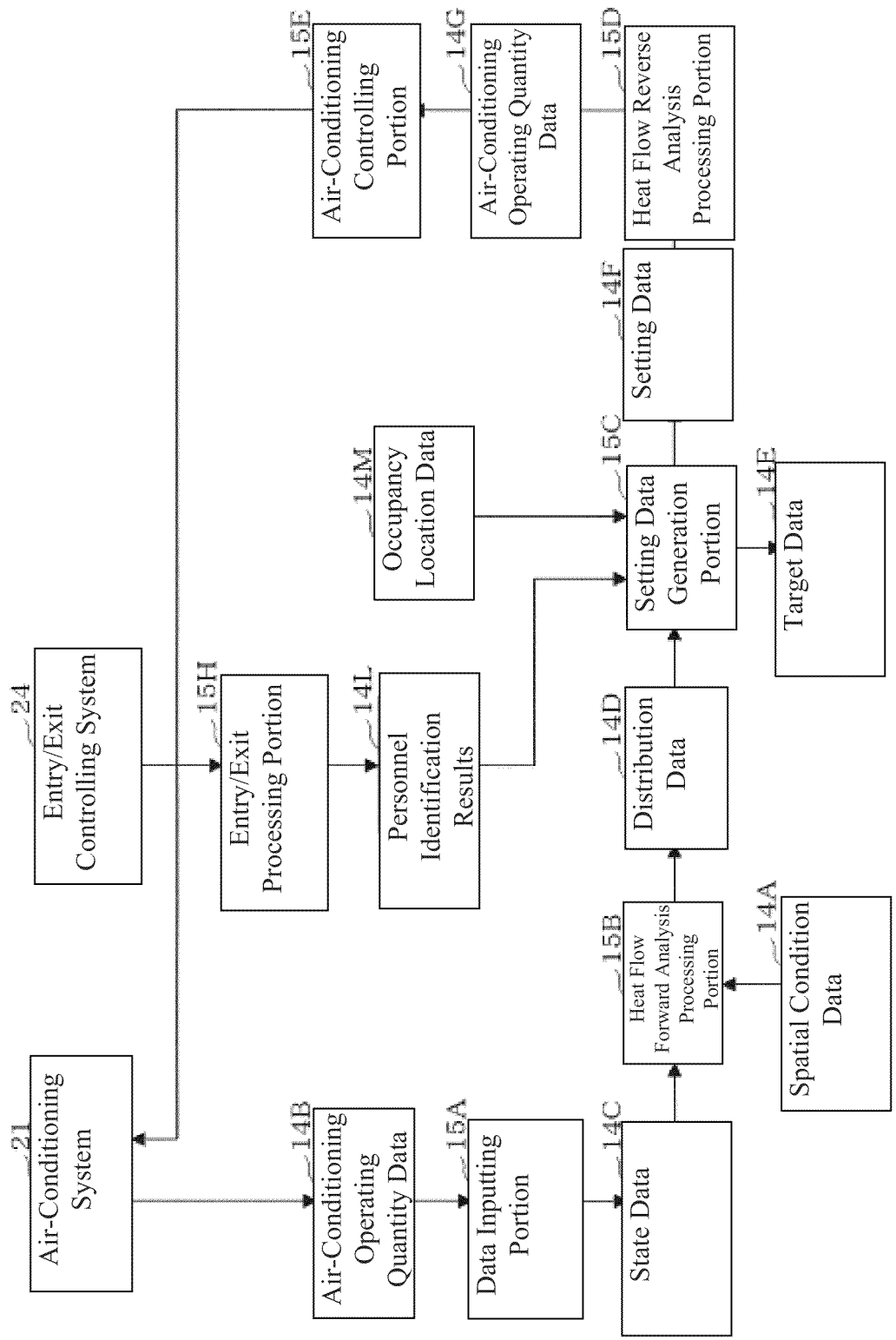
FIG. 19 is a flowchart illustrating an air-conditioning controlling process for an air-conditioning controlling device according to another example.

Next an air-conditioning controlling device according to an example according to the present invention is explained in reference to FIG. 19.

In the present example, as with the above, the explanation is for a case wherein the air-conditioned environment at the occupancy location is controlled automatically to an appropriate state through identifying automatically the occupancy locations of the personnel that are the heat emitting objects in the air-conditioned space 30 through the use of an entry/exit controlling system 24 that is provided together with the air-conditioning system 21 for the air-conditioned space 30.

An entry/exit processing portion 15H is provided in the calculation processing portion 15 of the air-conditioning controlling device 10 in the same manner as in the above examples. This entry/exit processing portion 15H has a function for obtaining entry/exit data through performing data communication with the entry/exit controlling system 24 through the communication I/F portion 11, and a function for identifying identification information for individuals who have entered into the air-conditioned space 30, based on the entry/exit data, and has a function for outputting this identification information as personnel identification results 14L.

The setting data generating portion 15C has a function for obtaining occupancy locations for individuals who have entered into the air-conditioned space 30, from the occupancy location data 14M of the storing portion 14 corresponding to the identification information included in the personnel identification results 14L, based on the personnel identification results 14L obtained by the entry/exit processing portion 15H, and a function for generating target data 14E for not only setting the occupancy location as the target location, but also for setting, as a target temperature, a setting temperature, such as a temperature that is appropriate for people working, which is set in advance into the storing portion 14 for the target location or in common for the air-conditioned space 30. Note that the appropriate temperature should be determined as appropriate by an operator depending on the details of the work.

The other structures in the air-conditioning controlling device 10 are identical to those in the other examples, and thus detailed explanations thereof will be omitted here.

The operation of the air-conditioning controlling device according to the present example is explained next in reference to FIG. 19.

When compared to the above, the overall air-conditioning controlling process sequence is identical to that in FIG. 9, but the process for generating the setting data in the setting data generating portion 15C is different.

First the entry/exit processing portion 15H identifies the identification information for the personnel entering into the air-conditioned space 30, based on the entry/exit data obtained through performing data communication with the entry/exit controlling system 24 through the communication I/F portion 11, and generates the personnel identification results 14L.

The setting data generating portion 15C obtains the occupancy locations of the people that have entered into the air-conditioned space, from the occupancy location data 14M of the storing portion 14 corresponding to the identification information based on identification information included in the personnel identification results 14L obtained from by the entry/exit processing portion 15171, and generates target data 14E that not only sets this location information as the target locations, but also sets, as the target temperature, the setting temperature read-out from the storing portion 14, to generate setting data 14F from the target data 14E and the distribution data 14D.

In this way, in the present example, the occupancy location data that indicate the occupancy location of the applicable individual for each unique identification information for each individual that uses the air-conditioned space 30, and human data 14I that include the amount of heat emitted in relation to humans, are stored in advance in the storing portion 14, and occupancy locations of the individuals that have entered into the air-conditioned space are obtained from the occupancy location data 14M corresponding to the identification information based on identification information for the applicable individuals inputted by the data inputting portion 15A in response to entry into the air-conditioned space 30, and target data 14E that not only sets this occupancy location as the target location, but that also sets, as the target temperature, the setting temperature that has been set in advance is generated, to generate setting data 14F from the target data 14E and the distribution data 14D.

This enables the automatic generation of target data 14E for causing the occupancy location of individuals that have entered to go to the setting temperature, and also generates automatically the setting data 14F, through inputting, into the data inputting portion 15A, the identification information for individuals that have entered into the air-conditioned space 30, identified by the entry/exit processing portion 15H, based on the entry/exit data from the entry/exit controlling system 24. This makes it possible to control the occupancy locations of those individuals automatically to the setting temperature, even when individuals move in and out of the air-conditioned space 30.

Moreover, while the explanation was above is for an example of a case that does not take into account the amount of heat emitted by individuals that have entered into the air-conditioned space, through use in combination with the other examples, described above, it is possible to generate automatically the heat emitting object data pertaining to the individuals who have entered the air-conditioned space, thus enabling more detailed air-conditioning control to be performed taking into consideration the amount of heat emitted by the individuals who have entered into the air-conditioned space.

Additionally, white the present explanation is for an example of a case of controlling automatically the occupancy locations of individuals who have entered into the air-conditioned space to a suitable air-conditioned environment based on entry/exit data obtained from the entry/exit controlling system 24, the data pertaining to individuals entering into the air-conditioned space is not limited to that of the entry/exit controlling system 24. For example, schedule information that includes the locations of occupancy of individuals and arrival times for arrival at those occupancy locations may be obtained from a schedule controlling system for controlling the schedules of individuals who use the air-conditioned space 30, to control the target locations, which include those occupancy locations, automatically to the setting temperature.

At this time, the air-conditioning control may commence beginning with the arrival time included in the schedule information, or the air-conditioning control may commence in advance of the arrival time, by a time required for control, so that the applicable occupancy locations will go to the setting temperature by the arrival time.

Moreover, while the explanation is for an example of a case wherein there is a correspondence within the air-conditioned space 30 of the occupancy locations for the individual users who use the air-conditioned space 30, there is no limitation thereto. For example, there is no limitation on the users of public air-conditioned spaces such as conference rooms and meeting rooms. However, when such air-conditioned spaces are used, it is possible to specify the locations wherein people are present in the air-conditioned space by specifying the locations wherein the chairs or desks are disposed. Because of this, it is possible to specify the target locations in the air-conditioning control through storing in advance, in the storing portion, layout information indicating the locations of the chairs in each air-conditioned space, such as conference rooms and meeting rooms.

Moreover, white the explanation in the present example is a case wherein the amount of heat produced by the heat emitting object was inputted in advance as heat emitting object data, there is no limitation thereto. The amount of heat emitted by the heat emitting objects can be calculated from the surface temperatures of the heat emitting objects, and thus the surface temperatures of the heat emitting objects may be inputted in advance as heat emitting object data.

Moreover, while in the present example heat emitting objects such as people, lighting fixtures, PCs, and electric devices such as copy machines and printers are envisioned as the heat emitting sources in the air-conditioned space 30, heat that flows in from adjacent rooms or from the outside air will also incur into the air-conditioned space 30. Consequently, heat incursion data pertaining to the incursion of heat that incurs into the air-conditioned space 30 in this way may be inputted by the data inputting portion 15A. Moreover, this incurred heat may be handled as heat emitted from walls or windows of the air-conditioned space 30, and may be inputted by the data inputting portion 15A as a portion of the heat emitting object data.

Moreover, while the explanation in the present example is a case wherein target data for target locations were inputted as target data by the setting data generating portion 15C, to cause the temperature to go to the target state quantity, there is no limitation thereto. For example, airflow speeds and humidities may be inputted as target data for the target locations, and the airflow speeds and humidities may be used as the target state quantities.

While the present invention was explained above in reference to examples, the present invention is not limited by the examples set forth above. The structures and details of the present invention may be modified in a variety of ways, as can be understood by those skilled in the art, within the scope of the present invention.

The invention claimed is:

1. An air-conditioning controlling device comprising:
    a storing portion storing spatial condition data indicating a location and shape pertaining to an air-conditioned space and a location and shape pertaining to a blowing vent for conditioned air produced by an air-conditioning system that performs air-conditioning of a conditioned space;
    a data inputting portion inputting boundary condition data indicating the blowing speed and blowing temperature of conditioned air blown from the blowing vent and also heat emitting object data that indicate the location and amount of heat emitted in relation to a heat emitting object that is present in the air-conditioned space;
    a heat flow forward analyzing portion calculating distribution data that indicate the distribution of temperatures and airflows of the air-conditioned space through a forward analysis of the state of the air-conditioned space, through a distributed system heat flow analysis technique, based on the spatial data and on state data comprising the boundary condition data and the heat emitting object data;
    a setting data generating portion generating setting data comprising the distribution data and target data indicating a target temperature at a target location within the air-conditioned space;
    a heat flow reverse analysis processing portion calculating sensitivity data that are required in order to satisfy the target data and indicate a degree of change in airflow rates, airflow directions, and temperatures in individual element spaces that divide the air-conditioned space, and back-calculating based on the sensitivity data a new air-conditioning operating quantity comprising a new blowing speed and blowing temperature for conditioned air from the blowing vent required to cause the target location to go to the target temperature, through a reverse analysis of the distribution of temperatures and airflows within the conditioned space, through a distributed system heat flow analysis technique, based on the setting data; and an air-conditioning controlling portion controlling the air-conditioned environment at the target location through controlling the air-conditioning system based on the new air-conditioning operating quantity, wherein the data inputting portion generates anew the boundary condition data and the heat emitting object data for new air-conditioning control for the air-conditioned space when an air-conditioning controlling timing arrives by identifying the arrival of the air-conditioning controlling timing at specific time intervals or in accordance with a change in the boundary condition data or the heat emitting object data.

2. The air-conditioning controlling device as set forth in claim 1, wherein:

the storing portion stores human data including the amount of heat emitted pertaining to humans; and the data inputting portion generates heat emitting object data for each person present in the air-conditioned space from the location wherein each applicable person is present and from the amount of heat emitted, obtained from the human data, based on an inputted location of presence for a person in the air-conditioned space.

3. The air-conditioning controlling device as set forth in claim 1, wherein:

the storing portion stores lighting fixture data, including a disposal location pertaining to the lighting fixture and the amount of heat emitted by the lighting fixture when illuminated, for each lighting fixture disposed in the air-conditioned space; and the data inputting portion generates heat emitting object data for each lighting fixture that is illuminated, from the disposal location and amount of heat emitted by the lighting fixture, obtained from the lighting fixture data pertaining to a lighting fixture that is illuminated, from among the lighting fixtures, based on an illumination status for each lighting fixture that has been inputted.

4. The air-conditioning controlling device as set forth in claim 1, wherein:

the storing portion stores occupancy location data indicating an occupancy location for the applicable person for each unique identification information for each individual who uses the air-conditioned space and the amount of heat emitted in regards to a person; and the data inputting portion generates heat emitting object data, for each individual present in the air-conditioned space, from the occupancy location and the amount of heat emitted, obtained from the human data, by obtaining the occupancy location of the individual from the occupancy location data corresponding to identification information based on identification information for the individual present in the air-conditioned space, inputted in accordance with an entry/exit of an individual into or out of the air-conditioned space.

5. The air-conditioning controlling device as set forth in claim 1, wherein:

the storing portion stores occupancy location data indicating an occupancy location for the applicable person for each unique identification information for each individual who uses the air-conditioned space; and the setting data generating portion obtains an occupancy location of an individual from occupancy location data corresponding to identification information based on identification information for the individual, inputted in accordance with entry of the individual into the air-conditioned space, to generate target data for setting the occupancy location as a target location and for setting a setting temperature, set in advance, as the target temperature, to generate setting data from the target data and the distribution data.

6. An air-conditioning controlling method comprising:

storing, with a storing portion, spatial condition data indicating a location and shape pertaining to an air-conditioned space and a location and shape pertaining to a blowing vent for conditioned air produced by an air-conditioning system that performs air-conditioning of a conditioned space;

inputting, with a data inputting portion, boundary condition data indicating the blowing speed and blowing temperature of conditioned air blown from the blowing vent and also heat emitting object data that indicate the location and amount of heat emitted in relation to a heat emitting object that is present in the air-conditioned space;

analyzing heat flow forward wherein a heat flow forward analyzing portion calculates distribution data that indicates the distribution of temperatures and airflows of the air-conditioned space through a forward analysis of the state of the air-conditioned space, through a distributed system heat flow analysis technique, based on the spatial data and on state data comprising the boundary condition data and the heat emitting object data;

generating, with a setting data generating portion, setting data comprising the distribution data and target data indicating a target temperature at a target location within the air-conditioned space;

analyzing reverse heat flow using a heat flow reverse analysis processing portion to calculate sensitivity data that are required in order to satisfy the target data and indicate a degree of change in airflow rates, airflow directions, and temperatures in individual element spaces that divide the air-conditioned space, and back-calculate based on the sensitivity data a new air-conditioning operating quantity comprising a new blowing speed and blowing temperature for conditioned air from the blowing vent required to cause the target location to go to the target temperature, through a reverse analysis of the distribution of temperatures and airflows within the conditioned space, through a distributed system heat flow analysis technique, based on the setting data; and controlling, with an air-conditioning controlling portion, the air-conditioned environment at the target location through controlling the air-conditioning system based on the new air-conditioning operating quantity, wherein the data inputting step is a step generating anew the boundary condition data and the heat emitting object data for new air-conditioning control for the air-conditioned space when an air-conditioning controlling timing arrives by identifying the arrival of the air-conditioning controlling timing at specific time intervals or in accordance with a change in the boundary condition data or the heat emitting object data.

7. The air-conditioning controlling method as set forth in claim 6, wherein:
the storing step includes storing human data including the amount of heat emitted pertaining to humans; and
the data inputting step includes generating heat emitting object data for each person present in the air-conditioned space from the location wherein each applicable person is present and from the amount of heat emitted, obtained from the human data, based on an inputted location of presence for a person in the air-conditioned space.

8. The air-conditioning controlling method as set forth in claim 6, wherein:
the storing step includes storing lighting fixture data, including a disposal location pertaining to the lighting fixture and the amount of heat emitted by the lighting fixture when illuminated, for each lighting fixture disposed in the air-conditioned space; and
the data inputting step includes generating heat emitting object data for each lighting fixture that is illuminated, from the disposal location and amount of heat emitted by the lighting fixture, obtained from the lighting fixture data pertaining to a lighting fixture that is illuminated, from among the lighting fixtures, based on an illumination status for each lighting fixture that has been inputted.

9. The air-conditioning controlling method as set forth in claim 6, wherein:
the storing step includes storing occupancy location data indicating an occupancy location for the applicable person for each unique identification information for each individual who uses the air-conditioned space and the amount of heat emitted in regards to a person; and
the data inputting step includes generating heat emitting object data, for each individual present in the air-conditioned space, from the occupancy location and the amount of heat emitted, obtained from the human data, by obtaining the occupancy location of the individual from the occupancy location data corresponding to identification information based on identification information for the individual present in the air-conditioned space, inputted in accordance with an entry/exit of an individual into or out of the air-conditioned space.

10. The air-conditioning controlling method as set forth in claim 6, wherein:
the storing step includes storing occupancy location data indicating an occupancy location for the applicable person for each unique identification information for each individual who uses the air-conditioned space; and
the setting data generating step includes obtaining an occupancy location of an individual from occupancy location data corresponding to identification information based on identification information for the individual, inputted in accordance with entry of the individual into the air-conditioned space, to generate target data for setting the occupancy location as a target location and for setting a setting temperature, set in advance, as the target temperature, to generate setting data from the target data and the distribution data.

* * * * *